United States Patent Office 3,432,517
Patented Mar. 11, 1969

3,432,517
METHOD FOR POLYMERIZING BUTADIENE; A CATALYST FOR USE IN SAID METHOD AND A METHOD FOR PRODUCING THE CATALYST
Kenichi Ueda, Hidetoshi Yasunaga, and Kouei Komatsu, Yokkaichi-shi, Japan, assignors to Japan Synthetic Rubber Co., Ltd., Chuo-ku, Tokyo, Japan, a corporation of Japan
No Drawing. Filed Apr. 22, 1965, Ser. No. 450,175
Claims priority, application Japan, June 6, 1964, 39/31,956
U.S. Cl. 260—94.3        10 Claims
Int. Cl. C08d 1/14; B01j 11/84

ABSTRACT OF THE DISCLOSURE

A process for producing cis-1,4-polybutadiene by contacting butadiene with a catalyst consisting of (A) a nickel salt of a carboxylic acid, (B) a boron halide or a halide of a metal of Groups IV and V of the Periodic Table and (C) an organoaluminum compound of the formula: $AlR_1R_2R_3$, wherein at least one of $R_1$, $R_2$ and $R_3$ is an alkoxy radical and at least one of $R_1$, $R_2$ and $R_3$ is a radical capable of forming an Al-C or Al-H bond. Said organoaluminum compounds include diethylaluminum monoethoxide, diethylaluminum monooctyloxide, diisobutylaluminum monoisobutoxide, etc.

In the catalyst, components (C) and (B) are present in a molar ratio of 0.1–5.0:1 and components (A) and (C) are present in a molar ratio of 0.1–7.0:1. The catalyst is produced by mixing components (A), (B) and (C) at a temperature of −80° C. to 80° C. in a hydrocarbon solvent.

This invention relates to a method for polymerizing butadiene with a novel catalyst. More particularly it relates to a method for producing polybutadiene having substantially all cis-1,4 configuration, and to polybutadiene produced thereby.

It has been heretofore known that cis-1,4 polybutadiene can be produced by contacting butadiene in the presence of a non-aqueous medium with a catalyst such as (1) a reaction mixture of a salt of a metal of Group VIII of the Periodic Table and an organometallic compound of a metal of Groups I, II and III of the table, (2) a reaction mixture of a salt of a metal of Group VIII of the table, an organometallic compound of a metal of Groups I, II and III of the table and a Lewis acid, or (3) a reaction mixture of an organometallic compound of a metal of Groups I, II and III of the table and a Lewis acid. Accordingly it has been necessary to use, as one component of the catalyst, an organometallic compound to produce cis-1,4 polybutadiene having more than 90 percent of cis-1,4 units and having various superior properties required as a general purpose rubber.

Such organometallic compounds as triethyl aluminum, triisobutyl aluminum, diethyl cadmium, diethyl zinc, diethyl aluminum monochloride, monoethyl aluminum dichloride and the like have been used for this purpose.
Namely the organometallic compounds considered useful for this purpose have been limited to those containing alkyl or aryl radicals, with or without hydrogen or halogen atom.

Since all such types of organometallic compounds react violently with oxygen or moisture in the air, their handling is very difficult, and even when they are stored under inert gas atmosphere, they react with a trace of oxygen or moisture to deteriorate. Such deterioration of an organometallic compound during its storage has been the cause of a decrease in polymerization velocity, and of a reduction in reproducibility of molecular weight of polymers, which has made it very difficult to product cis-1,4 polybutadiene having constant properties.

An object of the present invention is to provide a method for producing cis-1,4 polybutadiene which has not the disadvantages of those methods using the above-mentioned types of organometallic compounds.

This object can be attained in accordance wtih the present invention by using an organometallic compound having a carbon-oxygen bond besides carbon-carbon or carbon-hydrogen bond. According to the present invention, cis-1,4 polybutadiene having a high content of cis-1,4 units can be produced with high polymerization velocity, good reproducibility and excellent control of molecular weight. The present invention is a method for producing cis-1,4 polybutadiene which comprises contacting butadiene with a ternary catalyst consisting of component (A) of at least one compound selected from the group consisting of nickel salts of carboxylic acids, component (B) of at least one compound selected from the group consisting of boron halides and halides of a metal of Groups IV and V of the Periodic Table and component (C) of at least one compound selected from the group consisting of organoaluminum compounds represented by the formula $AlR_1R_2R_3$, wherein at least one of $R_1$, $R_2$ and $R_3$ is an alkoxy radical, and at least one of $R_1$, $R_2$ and $R_3$ is a radical capable of forming an aluminum-carbon or aluminum-hydrogen bond.

As regards using organoaluminum alkoxides, there has been known a method disclosed in Japanese patent publication 9,439/60. In this specification, there are disclosed aluminum compounds having alkoxy or aryloxy radical. However the method is directed to producing trans-1,4 polybutadiene with a two-component catalyst consisting of zirconium tetrachloride and dimethyl aluminum methoxide, and not to a process for producing cis-1,4 polybutadiene.

Another Japanese patent publication 8,341/61 suggests the use of an organoaluminum compound having an alkoxy radical as a catalyst component but does not disclose any examples thereof. In either of these patent publications there is no description of the production of cis-1,4 polybutadiene with the use of an organoaluminum alkoxide, much less of the characteristics when it is used as a component of the catalyst.

In the present invention, the organoaluminum alkoxide is uniquely effective being used in combination with other two components: (A) A nickel salt of a carboxylic acid and (B) a boron halide. As described hereinafter, the organoaluminum alkoxide is essentially different from any conventional organometallic compound heretofore used in the production of cis-1,4 polybutadiene which does not contain any alkoxy radical.

Among the three catalyst components of (A), (B) and (C) of the present invention, the compound of component (A) is a nickel salt of a carboxylic acid typical among them are nickel naphthenate, nickel formate, nickel octenate, nickel stearate, nickel citrate, nickel diacetyl acetonate, nickel ethylacetoacetate and the like.

The compound of component (B) is a boron halide or a halide of a metal of Groups IV and V of the Periodic Table. Typical among them are boron trifluoride, boron trifluoride etherate, titanium tetrachloride, titanium trichloride, titanium tetrafluoride, titanium tetrabromide, titanium tetraiodide, vanadium oxychloride, trichlorobutoxy titanium and the like.

Among the organoaluminum alkoxides to be used as the component (C), there are monoethyl monohydromonoethoxy aluminum, monoethyl monohydromonooctoxy aluminum, monoisobutyl monohydromonostearyloxy aluminum, diethyl monomethoxy aluminum, diethyl monoethoxy aluminum, diethyl monoisopropoxy aluminum diethyl monoisobutoxy aluminum, diethyl mononormalbutoxy aluminum, diethyl monopentoxy aluminum, diethyl monohexaoxy aluminum, diethyl monoheptaoxy aluminum, diethyl monooctoxy aluminum, diethyl mononaphthoxy aluminum, diethyl monodecaoxy aluminum, diethyl monododecyloxy aluminum, diethyl monostearyloxy aluminum, monoethyl dimethoxy aluminum, monoethyl diethoxy aluminum, monoethyl dipropoxy aluminum, monoethyl diisobutoxy aluminum, monoethyl dinormalbutoxy aluminum, monoethyl dihexaoxy aluminum monoethyl, heptaoxy aluminum, monoethyl dioctoxy aluminum, monoethyl dinonaoxy aluminum, monoethyl didecaoxy aluminum, monoethyl didodecaoxy aluminum, monoethyl dicetyloxy aluminum, monoethyl distearyloxy aluminum, dimethyl monoethoxy aluminum, diisopropyl monoethoxy aluminum, dinormalbutyl monoethoxy aluminum, diisobutyl monoethoxy aluminum, diisobutyl monoisobutoxy aluminum, monoisobutyl diisobutoxy aluminum, diaryl mono ethoxy aluminum, monoaryl diethoxy aluminum, dicrotyl monoethoxy aluminum, dioctyl monoethoxy aluminum, dioctyl monoisobutoxy aluminum and the like.

These organoaluminum alkoxide compounds do not usually ignite in air, and their reaction with water is also extremely small compared with conventional organometallic compounds. This means that the component (C) of the catalyst can be stored safely for a long time without loss of stability and this constitutes an important advantage of the present invention.

The catalyst of the present invention is prepared by mixing the three components (A), (B) and (C) usually at a temperature between −80° C. and 80° C. in a hydrocarbon-solvent. The catalysts thus prepared are soluble in hydrocarbon solvents, and the solution is colorless and transparent. This is also one of the important advantages of the present invention. That the catalytic system is perfectly soluble enables the reduction of the catalyst amount to be used and enables the production of cis-1,4 polybutadiene with good reproducibility. Furthermore it enables the catalyst residue remaining in the polymers to be eliminated very rapidly after the polymerization is finished, and enables deterioration and discoloring of the product to be avoided. And since the catalytic system is soluble, colorless and transparent, the resulting polymer does not stain.

The components (A), (B) and (C) can be mixed in any order. With any mixing order, it is possible to obtain polymers having high cis-1,4 content with high polymerization velocity. This is also another advantage of the present invention.

What is important in the preparation of the catalyst is the ratio of the components (A), (B) and (C). Particularly the ratio of component (B) to component (C) affects to a great degree the polymerization velocity and the molecular weight of the polymer. The mol ratio of component (C) to (B) is usually in the range of 0.1–5.0:1 and that of (A) to (C) is usually in the range of 0.1–7.0:1. For example in the catalytic system consisting of nickel naphthenate, boron trifluoride etherate and diethyl monoethoxy aluminum, the molecular weight and the polymerization velocity are at their maximum when $Al/BF_3$ (mol/mol) ratio is in the range of 0.4–1.4:1. In the catalytic system consisting of nickel naphthenate, boron trifluoride etherate and diethyl monostearyloxy aluminum, the molecular weight and the polymerization velocity are at their maximum when $Al/BF_3$ (mol/mol) ratio is in the range of 0.5–1.8:1. The catalyst of the invention is extremely stable in a nitrogen atmosphere, and does not deteriorate for a long time unlike the case of conventional organometallic compound. Accordingly the reproducibility of polymerization velocity and of molecular weight is extremely good, so that it is possible to produce cis-1,4 polybutadiene having constant properties. This is also another advantage of the present invention.

Another important advantage of the present invention is that the catalyst provides a product having a cis-1,4 content of more than 90 percent.

Since the catalyst of the present invention is, as abovementioned, stable and perfectly soluble, the polymerization can be conducted continuously as well as batchwise, particularly the former being advantageous. Catalytic systems containing alkoxy radicals having more than 8 carbon atoms are preferable to obtain perfectly soluble catalytic systems.

The solvents used in the present invention are aromatic-, aliphatic-, or alicyclic-hydrocarbons, which are liquid at room temperature. Particularly preferable ones are such aromatic hydrocarbons as benzene, toluene, xylene, and the like; such aliphatic hydrocarbons as pentane, hexane, heptane, octane, nonane, decane and the like; and alicyclic hydrocarbons such as cyclohexane, cycloheptane and the like. A mixture of these solvents can also be used. For example petroleum ether or the like is a preferable polymerization solvent.

Besides, aromatic-, aliphatic-, alicyclic-ether or a mixture of these ether can also be used as a solvent.

The polymerization of the present invention is carried out by contacting 1,3-butadiene at a temperature between −30° C. and 150° C., preferably between 0° C. and 100° C. with the catalyst prepared by mixing the three catalyst components in the above-mentioned solvent at a temperature between −80° C. and 80° C.

The following examples are given to illustrate the present invention but it shall be understood that the examples are merely illustrative and not intended to limit the scope of the invention.

The infra-red spectra analysis of catalysts and polymers in the examples were carried out with the 21 type infrared spectra apparatus of Perkin Elmer Company. The microstructures were analyzed by D. Morero's method (Chimica é L'industria, 91, No. 8(1959) p. 758) and the intrinsic viscosities were measured at a temperature of 30° C. with toluene solutions.

EXAMPLE 1

27.4 milliliters of toluene sufficiently dried by metallic sodium and then distilled were introduced into a dilatometer having a volume of 40 milliliters, which had been sufficiently dried under nitrogen gas atmosphere. From the nitrogen gas, oxygen and moisture had been sufficiently eliminated beforehand by passing the gas successively through anhydrous calcium chloride, molecular sieves and triethyl aluminum (0.5 percent Tetralin solution by weight). The dilatometer was immersed in a thermostat at 30° C., and the solution obtained by dissolving in 1.23 milliliters of toluene 0.0314 gram of terpene solution of nickel naphthenate containing 5.16 percent nickel by weight was introduced into the dilatometer from the top. Then 0.20 milliliter of boron trifluoride etherate (1 mol toluene solution) was gradually introduced. The reaction mixture become slightly turbid but maintained the pale yellow of nickel naphthenate.

After stirring the mixture for 10 minutes, 0.36 milliliter of diethyl aluminum monoethoxide (0.5 mol toluene solution) was gradually added. There was no change in the color of the reaction mixture. After stirring it for another 30 minutes at a temperature of 30° C., the dilatometer was immersed in liquid nitrogen to freeze the reaction system. Then the pressure of the dilatometer was reduced to 1 mm. Hg and 4.19 grams of butadiene which had been purified by being passed successively through aqueous solution of potassium hydroxide, calcium chloride, granular potassium hydroxide, and molecular sieves was charged by distillation into the dilatometer.

Subsequently the pressure of the dilatometer was restored to atmospheric pressure by introducing nitrogen, in, and then the top of the dilatometer was sealed with a gas burner.

The dilatometer thus charged was immersed in a thermostat at 40° C.±0.05° C.

It was observed that as soon as the temperature of the reaction system reached 40° C., the reaction started. After two hours, the dilatometer was immersed in liquid nitrogen to stop the reaction, and the contents were poured into methanol containing 1.0 percent by weight of phenyl-β-naphthylamine. The polymer was separated as a white precipitate. After being washed with the above-mentioned methanol several times, the polybutadiene was dried in vacuo for 3 days. The yield of resulting cis-1,4 polybutadiene was 86.7 percent based on butadiene monomer used. Its intrinsic viscosity was 3.45, and it contained 96.8 percent of cis-1,4 content, 2.1 percent of trans-1,4 content and 1.1 percent of vinyl content.

EXAMPLES 2-9

In these examples, the polymerizations were carried out by changing the proportion of nickel naphthenate, diethyl aluminum monoethoxide and boron trifluoride etherate from that of Example 1.

The methods for preparing catalyst, for polymerizing butadiene and for finishing were exactly the same as in Example 1. The results are shown in Table 1 wherein Et means $C_2H_5$.

TABLE 1

| Number of examples | Amount of Nickel (mg. atom Ni/l.) | $Et_2AlOEt$ (mmol/l.) | $BF_3OEt_2$ (mmol/l.) | Al/BF₃ (mol/mol) | Polymerization temperature, °C. | Polymerization time, min. | Yield, percent | [η] | Microstructure Cis, percent | Trans, percent | Vinyl, percent |
|---|---|---|---|---|---|---|---|---|---|---|---|
| 2 | 0.8 | 2.98 | 5.76 | 0.5 | 40 | 60 | 50.9 | 1.76 | 96.7 | 1.8 | 1.5 |
| 3 | 0.8 | 4.03 | 5.76 | 0.7 | 40 | 60 | 52.8 | 2.40 | | | |
| 4 | 0.8 | 5.18 | 5.76 | 0.9 | 40 | 100 | 84.1 | 3.92 | 95.6 | 2.7 | 1.7 |
| 5 | 0.8 | 6.33 | 5.76 | 1.1 | 40 | 100 | 76.6 | 5.09 | | | |
| 6 | 0.8 | 8.63 | 5.76 | 1.5 | 40 | 60 | 48.5 | 4.52 | 96.2 | 2.7 | 1.1 |
| 7 | 0.8 | 5.18 | 10.36 | 0.5 | 40 | 70 | 85.2 | 2.75 | | | |
| 8 | 1.1 | 8.28 | 9.18 | 0.9 | 40 | 60 | 80.6 | 2.46 | 96.4 | 2.6 | 1.6 |
| 9 | 0.8 | 5.18 | 5.76 | 0.9 | 40 | 40 | 86.6 | 2.72 | 96.0 | 2.3 | 1.7 |

It is clear that the molecular weight can be varied extensively by changing the amount of $Et_2AlOEt$.

EXAMPLE 10

Instead of the diethyl aluminum monoethoxide of Example 1, diethyl aluminum monooctyloxide was used in this example. In this example diethyl aluminum monooctyloxide was prepared from triethyl aluminum and octyl alcohol in accordance with following procedure.

16.64 grams of triethyl aluminum were charged under nitrogen atmosphere into a 200 milliliter three-necked flask equipped with a Jimlord cooler at the top, and then the flask was cooled to —5° C.

18.89 grams (0.145 mol) of octyl alcohol were gradually added into the flask through a 50 milliliter dropping funnel under nitrogen atmosphere. After the addition of octyl alcohol, the temperature was gradually increased to room temperature and the mixture was stirred for 60 minutes at that temperature.

Subsequently the flask was immersed in a high temperature bath and subjected to vacuum distillation at a temperature of 200° C. Diethyl aluminum monooctyloxide was obtained as a fraction distilling between 180° C. and 186° C. at a pressure of 1.5 mm. Hg. This substance was confirmed as diethyl aluminum monooctyloxide by the facts that the gas generated during the reaction was ethylene, the amount of which corresponded to the stoichiometric equivalent amount and that the characteristic absorptions of the ether bond were observed qualitatively at wave numbers of 1050 and 1100 cm.$^{-1}$ by the infrared spectra analysis.

The polymerization and finishing procedure was the same as in Example 1 except that petroleum ether was used as the polymerization solvent.

With the catalyst consisting of 0.8 mg. atom Ni/liter of nickel naphthenate, 5.76 millimols/liter of boron trifluoride etherate, and 5.18 millimols/liter of diethyl aluminum monooctyloxide, the polymer was obtained after 95 minutes with a yield of 88.6 percent based on butadiene monomer. Its intrinsic viscosity and microstructure were as follows: [η], 4.42; cis-1,4 content, 96.8 percent; trans-1,4 content, 1.8 percent; and vinyl content, 1.4 percent.

EXAMPLES 11 TO 21

Instead of diethyl aluminum monoethoxide and diethylaluminum monooctyloxide of Examples 1-9 and Example 10, various other aluminum alkoxides as component (C) were used in these examples. And the polymerization solvent was hexane. The results are shown in Table 2.

TABLE 2

| Number of Examples | Component (C) (mmol./l.) | Nickel naphthenate, mg. atom Ni/l. | BF₃OEt₂ mmol./l. | Hexane/Butadiene, weight ratio | Component (C) BF₃OEt₃, mo ratio | Polymerization time, min. | Yield, percent | [η] | Microstructure | | |
|---|---|---|---|---|---|---|---|---|---|---|---|
| | | | | | | | | | Cis, percent | Trans, percent | Vinyl, percent |
| 11 | (C₂H₅)₂AlOC₁₈H₃₇, 7.78 | 1.2 | 8.65 | 6/1 | 0.9 | 120 | 87.6 | 2.66 | 96.1 | 1.2 | 2.8 |
| 12 | (C₂H₅)₂AlOC₁₈H₃₇, 7.26 | 0.8 | 5.76 | 6/1 | 1.25 | 120 | 81.2 | 3.23 | 96.4 | 1.9 | 1.7 |
| 13 | (C₂H₅)₂Al(OC₂H₅)₂, 5.18 | 0.8 | 5.76 | 6/1 | 0.9 | 312 | 41.4 | 3.16 | 96.6 | 1.2 | 2.2 |
| 14 | (i-C₄H₉)₂AlOC₈H₁₇, 8.28 | 1.1 | 9.18 | 4/1 | 0.9 | 120 | 70.2 | 2.88 | | | |
| 15 | (i-C₄H₉)₂AlOC₁₈H₃₇, 7.26 | 1.1 | 5.76 | 6/1 | 1.25 | 120 | 68.1 | 2.96 | 97.1 | 0.9 | 2.0 |
| 16 | (i-C₈H₁₇)₂AlOC₈H₁₇, 8.28 | 0.8 | 0.18 | 4/1 | 0.9 | 120 | 87.5 | 2.85 | | | |
| 17 | (i-C₈H₁₇)₂AlOC₁₈H₃₇, 8.28 | 1.1 | 12.40 | 4/1 | 1.5 | 120 | 66.2 | 2.68 | 96.1 | 2.2 | 1.7 |
| 18 | (C₂H₅)₂AlOCH₂C₆H₅, 8.28 | 1.1 | 9.18 | 4/1 | 0.9 | 120 | 80.2 | 3.21 | | | |
| 19 | (C₂H₅)₂AlOC₆H₁₁, diethylaluminum cyclohexaoxide, 8.28 | 1.1 | 9.18 | 4/1 | 0.9 | 120 | 76.2 | 2.89 | 95.8 | 2.8 | 1.4 |
| 20 | (C₂H₅)₂AlOC₁₈H₃₅, 8.28 | 1.1 | 9.18 | 4/1 | 0.9 | 120 | 72.1 | 2.36 | 95.2 | 2.6 | 2.2 |
| 21 | (C₂H₅)₂AlOCH₂OCH, diethylaluminum propalgyloxide, 8.28 | 1.1 | 9.18 | 4/1 | 0.9 | 240 | 40.4 | 1.28 | | | |

TABLE 3

| Number of Examples | Component (A) (Mg. atom Ni/l.) | Component (B) | Et₂AlOEt, mmol./l. | BF₃OEt₂ mmol./l. | Toluene/butadiene, weight ratio | Polymerization time, min. | Yield, percent | [η] | Microstructure | | |
|---|---|---|---|---|---|---|---|---|---|---|---|
| | | | | | | | | | Cis, percent | Trans, percent | Vinyl, percent |
| 22 | 2.2 | Nickel stearate | 16.56 | 18.26 | 4/1 | 240 | 80.6 | 2.38 | 95.8 | 2.4 | 1.8 |
| 23 | 2.2 | do | 16.56 | 18.26 | 4/1 | 120 | 77.8 | 2.96 | | | |
| 24 | 2.2 | Nickel oleate | 16.56 | 18.26 | 4/1 | 120 | 90.6 | 2.21 | 96.4 | 1.9 | 1.7 |

TABLE 4

| Number of Examples | Component (A) Nickel naphthenate mg. atom Ni/l. | Component (B) | Et₂AlOEt, mmol./l. | BF₃OEt₂ mmol./l. | Toluene/butadiene, weight ratio | Polymerization time, min. | Yield, percent | [η] | Microstructure | | |
|---|---|---|---|---|---|---|---|---|---|---|---|
| | | | | | | | | | Cis, percent | Trans, percent | Vinyl, percent |
| 25 | 2.2 | TiCl₄ | 33.1 | 2.2 | 4/1 | 240 | 56.6 | 2.28 | 92.2 | 5.4 | 2.4 |
| 26 | 2.2 | TiCl₄ | 33.1 | 2.2 | 4/1 | 240 | 18.2 | 2.81 | | | |
| 27 | 2.2 | TiCl₄ | 33.1 | 2.2 | 4/1 | 240 | 16.1 | 1.98 | 93.4 | 2.8 | 3.8 |
| 28 | 2.2 | VOCl₃ | 33.1 | 2.2 | 4/1 | 120 | 61.2 | 1.38 | 95.1 | 1.9 | 3.0 |
| 29 | 2.2 | VOCl₃ | 33.1 | 2.2 | 4/1 | 240 | 29.3 | 2.01 | | | |

TABLE 5

| Number of Examples | Component (A) | (Mg. atom Ni/l.) | BF₃OEt₃ (mmol./l.) | Component (C) (mmol./l.) | Polymerization time, min. | Yield, percent | [η] | Microstructure | | |
|---|---|---|---|---|---|---|---|---|---|---|
| | | | | | | | | Cis, percent | Trans, percent | Vinyl, percent |
| 30 | Ni diacetyl acetonate | 2.2 | 18.26 | (C₂H₅)₂Al(OC₂H₅) 16.56 | 120 | 89.9 | 3.56 | 95.5 | 2.0 | 2.5 |
| 31 | do | 2.2 | 18.26 | (C₂H₅)₂Al(OC₆H₁₇) 16.56 | 120 | 96.1 | 3.99 | 96.4 | 1.9 | 1.5 |
| 32 | Ni ethyl-acetoacetate | 2.2 | 18.26 | (C₂H₅)₂Al(OC₆H₅) 16.56 | 120 | 97.2 | 4.55 | 97.0 | 1.6 | 1.4 |
| 33 | do | 2.2 | 18.26 | (C₂H₅)₂Al(OC₁₈H₃₇) 16.56 | 240 | 90.1 | 2.98 | 98.0 | 1.1 | 0.9 |

EXAMPLES 22 TO 24

Instead of nickel naphthanate in Example 1, various other kinds of component (A) were used in these examples. The results are shown in Table 3.

EXAMPLES 25 TO 29

Instead of boron trifluoride in Example 1, various other kinds of component (B) were used in these examples. The results are shown in Table 4.

EXAMPLES 30 TO 33

Polymerizations of butadiene were carried out in toluene with a volume ratio of monomer to toluene of 1:4 at a temperature of 40° C. with catalysts in which nickel diacetyl acetonate or nickel ethylacetoacetate was used as component (A), boron trifluoride etherate was used as component (B) and diethylaluminum ethoxide, diethylaluminum octyloxide or diethyl staryloxy aluminum was used as component (C). The results are shown in Table 5.

What is claimed is:

1. A process for producing cis-1,4-polybutadiene, said process comprising contacting butadiene with a ternary catalyst consisting of components
   (a) a nickel salt of a carboxylic acid,
   (b) at elast one member of the group consisting of boron halides and halides of a metal of Groups IV and V of the Periodic Table, and
   (c) at least one organoaluminum compound of the formula $AlR_1R_2R_3$, wherein at least one of $R_1$, $R_2$ and $R_3$ is an alkoxy group, at least one of $R_1$, $R_2$ and $R_3$ is a group capable of forming an Al—C or Al—H bond and the remaining member of $R_1$, $R_2$ and $R_3$ is an alkyl group.

2. A process as claimed in claim 1, wherein components (c) and (b) are present in a molar ratio of 0.1–5.0:1 and components (a) and (c) are present in a molar ratio of 0.1–7.0:1.

3. A process as claimed in claim 1, wherein butadiene is contacted with the catalyst at a temperature of —30° to 150° C.

4. A process as claimed in claim 3, wherein the temperature is 0° to 100° C.

5. A process as claimed in claim 1, wherein butadiene is contacted with the catalyst in the presence of at least one aliphatic, alicyclic or aromatic hydrocarbon which is liquid at room temperature.

6. A process for producing cis-1,4-polybutadiene which comprises contacting butadiene with a catalyst consisting of nickel naphthenate, boron trifluoride etherate and diethyl monoethoxy aluminum at a mol ratio of $Al/BF_3$ of 0.4–1.4:1 at a temperature between 0° C. and 100° C. in the presence of an aliphatic, aromatic or alicyclic hydrocarbon which is liquid at room temperature.

7. A process for producing cis-1,4-polybutadiene which comprises contacting butadiene with a catalyst consisting of nickel naphthenate, boron trifluoride etherate and diethyl monostearyloxy aluminum at a mol ratio of $Al/BF_3$ of 0.5–1.8:1 at a temperature between 0° C. and 100° C. in the presence of an aliphatic, aromatic or alicyclic hydrocarbon which is liquid at room temperature.

8. A butadiene polymerization catalyst consisting of components (a) a nickel salt of a carboxylic acid, (b) at least one member of the group consisting of boron halides and halides of a metal of Groups IV and V of the Periodic Table and (c) at least one organoaluminum compound of the formula $AlR_1R_2R_3$, wherein at least one of $R_1$, $R_2$ and $R_3$ is an alkoxy group, at least one of $R_1$, $R_2$ and $R_3$ is a group capable of forming an Al—C or Al—H bond and the remaining member of $R_1$, $R_2$ and $R_3$ is an alkyl group.

9. A butadiene polymerization catalyst as claimed in claim 8, wherein components (c) and (b) are present in a molar ratio of 0.1–5.0:1 and components (a) and (c) are present in a molar ratio of 0.1–7.0:1.

10. A process for producing the catalyst as claimed in claim 8 which comprises mixing components (a), (b) and (c) at a temperature of —80° to 80° C. in a hydrocarbon solvent.

References Cited

UNITED STATES PATENTS

| | | | |
|---|---|---|---|
| 3,135,725 | 6/1964 | Carlson | 260—94.3 |
| 3,170,907 | 2/1965 | Uneda et al. | 260—94.3 |

FOREIGN PATENTS 905,099  9/1962  Great Britain.

JOSEPH L. SCHOFER, *Primary Examiner.*

R. A. GAITHER, *Assistant Examiner.*

U.S. Cl. X.R.

252—429